(12) United States Patent
Merritt

(10) Patent No.: US 11,691,999 B2
(45) Date of Patent: Jul. 4, 2023

(54) HOMOGENOUS HUMATE POWDER COMPOSITIONS EXHIBITING HIGH SOLUBILITY

(71) Applicant: Kevin Merritt, St. Johns, FL (US)

(72) Inventor: Kevin Merritt, St. Johns, FL (US)

(73) Assignee: HUMIC GROWTH SOLUTIONS, LLC, Jacksonville, FL (US)

( * ) Notice: Subject to any disclaimer, the term of this patent is extended or adjusted under 35 U.S.C. 154(b) by 246 days.

(21) Appl. No.: 16/924,856

(22) Filed: Jul. 9, 2020

(65) Prior Publication Data
US 2021/0323988 A1 Oct. 21, 2021

Related U.S. Application Data

(63) Continuation-in-part of application No. 15/878,782, filed on Jan. 24, 2018, now Pat. No. 10,723,667, which is a continuation-in-part of application No. 14/738,865, filed on Jun. 13, 2015, now Pat. No. 9,914,670.

(60) Provisional application No. 62/013,789, filed on Jun. 18, 2014.

(51) Int. Cl.
| | |
|---|---|
| *C07G 1/00* | (2011.01) |
| *C05D 1/00* | (2006.01) |
| *C05F 11/02* | (2006.01) |
| *C05G 5/12* | (2020.01) |

(52) U.S. Cl.
CPC ............. *C07G 1/00* (2013.01); *C05D 1/00* (2013.01); *C05F 11/02* (2013.01); *C05G 5/12* (2020.02)

(58) Field of Classification Search
CPC ............. C07G 1/00; C05D 1/00; C05F 11/02; C05G 5/12; C05G 5/10
See application file for complete search history.

(56) References Cited

U.S. PATENT DOCUMENTS

| | | | |
|---|---|---|---|
| 2,992,093 A | 7/1961 | Burdick | |
| 3,617,237 A * | 11/1971 | Nagasawa | B01J 2/00 23/313 R |
| 3,700,728 A | 10/1972 | Moschopedis et al. | |
| 3,932,166 A | 1/1976 | Vignovich et al. | |
| 4,015,972 A | 4/1977 | Watkins et al. | |
| 4,459,149 A | 7/1984 | Moran et al. | |

(Continued)

FOREIGN PATENT DOCUMENTS

| | | |
|---|---|---|
| CN | 1026095 | 10/1994 |
| CN | 101024590 B | 11/2010 |

(Continued)

OTHER PUBLICATIONS

Mestre, Claudia Bono. "Potassium humate as biostimulant" Evenagro. Sep. 30, 2019 (Year: 2019).*

(Continued)

*Primary Examiner* — Jennifer A Smith
(74) *Attorney, Agent, or Firm* — Gray Ice Higdon

(57) ABSTRACT

A process for making a potassium humate zinc sulfate compound, the process including: obtaining a plurality of fully-soluble potassium humate powder particles; obtaining a zinc sulfate compound; and mixing the plurality of potassium humate particles with the zinc sulfate compound, thereby forming a homogenized mixture, thereby forming a potassium humate zinc sulfate compound configured to be applied to a soil surface.

14 Claims, 3 Drawing Sheets

(56) References Cited

U.S. PATENT DOCUMENTS

| | | |
|---|---|---|
| 5,026,416 A | 6/1991 | Alexander |
| 5,034,045 A | 7/1991 | Alexander |
| 5,876,479 A | 3/1999 | Hedgpeth |
| 6,783,567 B1 | 8/2004 | Waters |
| 8,388,722 B2 | 3/2013 | Lynch et al. |
| 9,914,670 B1 | 3/2018 | Merritt |
| 10,597,337 B1 | 3/2020 | Merritt |
| 10,723,667 B1 | 7/2020 | Merritt |
| 11,117,840 B1 | 9/2021 | Merritt |
| 11,136,275 B2 | 10/2021 | Merritt |
| 11,136,505 B2 | 10/2021 | Merritt |
| 2005/0039509 A1 | 2/2005 | Muma |
| 2008/0216534 A1 | 9/2008 | Karr |
| 2011/0259067 A1 | 10/2011 | Lynch |
| 2013/0239633 A1 | 9/2013 | Halos |
| 2016/0200634 A1 | 7/2016 | Zaseybida |
| 2016/0229761 A1 | 8/2016 | Cherry |
| 2017/0334795 A1 | 11/2017 | Cherry |
| 2018/0311712 A1 | 11/2018 | Le |
| 2020/0148952 A1 | 5/2020 | Merritt |
| 2020/0270183 A1 | 8/2020 | Merritt |
| 2022/0017824 A1 | 1/2022 | Merritt |
| 2022/0204421 A1 | 6/2022 | Merritt |

FOREIGN PATENT DOCUMENTS

| | | | |
|---|---|---|---|
| CN | 101905983 | | 12/2010 |
| CN | 202148263 U | | 2/2012 |
| CN | 102718605 A | * | 10/2012 |
| CN | 102718605 A | | 10/2012 |
| CN | 101768019 B | | 12/2012 |
| CN | 102898254 A | | 1/2013 |
| CN | 102942417 | | 2/2013 |
| CN | 101935243 B | | 7/2013 |
| CN | 102875248 B | | 10/2014 |
| CN | 104892296 | | 9/2015 |
| CN | 107746331 A | * | 3/2017 |
| CN | 107056444 A | * | 8/2017 |
| CN | 107746331 A | | 3/2018 |
| CN | 109485501 A | | 3/2019 |
| CN | 110734334 A | * | 1/2020 |
| CN | 110734334 A | | 1/2020 |
| EP | 1216976 A2 | | 6/2002 |
| IN | 02359CH2010 | | 9/2010 |
| RU | 2443663 | | 2/2012 |
| RU | 2491266 C1 | | 1/2013 |
| WO | 9533702 A1 | | 12/1995 |
| WO | 2010094985 A1 | | 8/2010 |
| WO | 2013057168 A2 | | 4/2013 |
| WO | WO2022011268 | | 1/2022 |

OTHER PUBLICATIONS

United States Patent Office, Non-Final Office Action in U.S. Appl. No. 16/814,539 dated Jul. 26, 2021.
Granular Myco (GreenGro Biologicals) <https://www.thegreengro.com/product/granular-myco/> Oct. 23, 2017 (Year: 2017).
Premium Ultrafine (GreenGro Biologicals) <https://www.thegreengro.com/product/premium-ultrafine/> 2017 (Year: 2017).
Maxwell. "HumiMax" <https://d2j31icv6dlhz6.cloudfront.net/O/16EACbqUqFlemViO7sUS/maxwell-humimax-leaflet-2019.pdf> 2019 (Year: 2019).
Fulton, John, and Kaylee Port. "Physical properties of granular fertilizers and impact on spreading." Ohio State University, FABE-550.1 (2016). (Year: 2016).
Lindenmayer, R. "Zinc Fertilization: a Review of Scientific Literature." (2007).
U.S. Appl. No. 17/492,917, filed Oct. 4, 2021 titled Potassium Humate Sulfur Compound Granule.
International Search Report and Written Opinion for PCT/US2021/041100 dated Oct. 11, 2021.
Anonymous: "Potassium humate—Wikipedia", May 3, 2019 Retrieved from the Internet: URL: https://en.wikipedia.org/wiki/Potassium_humate [retrieved on Sep. 30, 2021].
Wang et al., Evaluation of Methods of Determining Humic Acids in Nucleic Acid Samples for Molecular Biological Analysis, Biosci. Biotechnol. Biochem., 75(2), 355-357, 2011.
AGN Microbial Selection and Sub-Profiling, Cisbay, www.cisbay.com.
Van Zomeren, Measurement of Humic and Fulvic Acid Concentrations and Dissolution Properties by a Rapid Batch Procedure, Environ. Sci. Technol., 41 (19), pp. 6755-6761, 2007.
Babalola, Beneficial bacteria of agricultural importance, Biotechnol Lett, 32, 1559-1570, 2010.
Comans et al., Concentrations of total dissolved organic carbon and humic and hydrophilic sub-fractions extracted from major Dutch soil types and their relation with soil properties, Geophysical Research Abstractsvol. 15, EGU2013-13841, 2013.
Grow More; Humic/Fulvic Acids, pp. 1-7, Dec. 31, 2003.
Halliday, The relationship between Humalite, Leonardite, and Fertilizers, Black Earth, 2015.
Humic Growth Solutions; Diamond-Grow Organic 100% Water Soluble Spray Dried Humic Acid Powder, pp. 1-2, Jacksonville, FL Dec. 31, 2013.
Topp, Bacteria in agricultural soils: Diversity, role and future perspectives, Canadian Journal of Soil Science, 83, 303-309, 2003.
Javanshah et al., Determination of Humic Acid by Spectrophotometric Analysis in the Soils, International Journal of Advanced Biotechnology and Research (IJBR), vol. 7, pp. 19-23. Special Issue—Apr. 2016.
Lamar et al., A New Standardized Method for Quantification of Humic and Fulvic Acids in Humic Ores and Commercial Products,Journal of AOAC International, 97, 721-730, 2014.
Mineral Logic, LLC, Bioactive Fulvic, Testing Method, Natural Organic Matter Research, 2017.
Myneni, Functional Group Chemistry of Humic Substances, Molecular Environmental Geochemistry Group, the Department of Geosciences, Princeton University, Guyot Hall Princeton, NJ 08544.
U.S. Appl. No. 15/878,773, filed Jan. 24, 2018 titled "Process for Making a Fully Water-Soluble Granule Comprising Humic Acid and a Microbial Community Composition".
U.S. Appl. No. 16/210,646, filed Dec. 5, 2018 titled "Process for Making a Semi-Soluble Granule Comprising Rock Phosphate and Humic Acid".
U.S. Appl. No. 16/266,749, filed Feb. 4, 2019 titled "Potassium Humate Sulfur Compound Granule".
U.S. Appl. No. 16/387,131, filed Apr. 17, 2019 titled "Process for Making a Composite Granule With Rock Phosphate, Sulfur, and Humic Acid".
Environmental Fertilisers. "EF Soluble Humate Granules". pp. 1-2 < http://environmentalfertilisers.co.nz/ef-soluble-humate-granules/ >Jun. 21, 2013.
Wikipedia. "Potassium humate". < https.://en.wikipedia.org.wiki/Potassium_humate > Mar. 7, 2013.
The Andersons. Products—Andersons Humates | Humic DG . < https://andersonshumates.com/products/ > May 21, 2013.
Humic DG Product Label. 2016.
Baloach, et al. "Integrated effect of phosphate solubilizing bacteria and humic acid on physiomorphic attributes of maize." International Journal of Current Microbiology and Applied Sciences 3.6 (2014): 549-554.
Canadian Patent Application 3,070,820 filed Feb. 4, 2020 titled Potassium Humate Sulfur Compound Granule.
Canadian Patent Application 3,077,954 filed Apr. 15, 2020 titled Process for Making a Composite Granule With Rock Phosphate, Sulfur, and Humic Acid.
IPCO "Rotoform pastillation for sulphur bentonite" <https://ipco.com/wp-content/uploads/2018/03/IPCO_IP_Sulphur-Bentonite_2018.pdf> Mar. 2018 (Year: 2018).
Jacob, Kenneth Donald, et al. The composition and distribution of phosphate rock with special reference to the United States No. 1488-2016-124804. 1933.
Mexican Patent Application MX/A/2020/001397 filed Feb. 4, 2020 titled Potassium Humate Sulfur Compound Granule.

(56) References Cited

OTHER PUBLICATIONS

Mexican Patent Applicantion MX/a/2020/004003 filed Apr. 20, 2020 titled Process for Making a Composite Granule With Rock Phosphate, Sulfur, and Humic Acid.
Saint Humic Acid "Potassium humate technical data sheet" <https://www2.slideshare.net/SAINTHUMICACID/potassium-humate-technical-data-sheet-81883698> Nov. 11, 2017 (Year: 2017).
Sharma, A. K., Seema Wahab, and Rashmi Srivastava, eds. Agriculture diversification: problems and perspectives. IK International Pvt Ltd, 2010.
U.S. Appl. No. 16/814,539, filed Mar. 10, 2020 titled Process for Making a Fully Water-Soluble Granule Comprising Humic Acid and a Microbial Community Composition.
U.S. Appl. No. 17/206,053, filed Mar. 18, 2021 titled Process for Making a Semi-Soluble Humic Granule.
United States Patent Office, Notice of Allowance in U.S. Appl. No. 16/210,646 dated Apr. 1, 2021.
United States Patent Office, Final Office Action in U.S. Appl. No. 16/266,749 dated Apr. 5, 2021.
Huey, Lee J., Osumanu H. Ahmed, and Nik MA Majid. "Effects of Extractants on the Yields and Selected Chemical Characteristics of Humic Acids Isolated from Tropical Saprists Peat." American Journal of Applied Sciences 7.7(2010): 933. (Year: 2010).
Degryse, Fien, et al. "Uptake of elemental or sulfate-S from fall-or spring-applied co-granulated fertilizer by corn—a stable isotope and modeling study." Field crops research 221 (2018): 322-332.
Hiroyuki, Interactions of Methylotrophs with Plants and Other Heterotrophic Bacteria, Microorganisms 2015, 3, 137-151; doi: 10.3390/microorganisms3020137, www.mdpi.com/journal/microorganisms, Apr. 2, 2015.
Mexican Patent Application MX/a/2022/003257 filed Mar. 17, 2022 titled Process for Making a Semi-Soluble Humic Granule.

\* cited by examiner

HOMOGENOUS HUMATE POWDER COMPOSITIONS EXHIBITING HIGH SOLUBILITY

FIELD OF THE INVENTION

A process such as is described in various embodiments herein relates to making a potassium humate zinc sulfate compound. Such a compound may be used in a liquid, powder, or granule form and is useful as an organic aid to crop growth as well as useful for overcoming a plethora of soil problems.

BACKGROUND OF THE INVENTION

It is known that humic substances (HS) include fulvic acid, humic acid, and/or humin. Of these, fulvic acid has the lowest molecular weight and least resistance to decomposition by microorganisms; humin has the highest molecular weight and greatest resistance to decomposition, because it has a large number of negative charges per unit mass, humin also has a very high CEC. The large molecules of humus bind to clay particles and greatly increase aggregate formation and stability therefore improving soil properties. Humin is the alkali (and acid) insoluble portion of HS that many manufacturers dispose of, although it is known that there are individuals who may extract and use it.

Since it takes longer for dry lignite to be broken down, and thus be functional in the soil, it is necessary to convert the lignite into forms that provide a more timely overall benefit (e.g. transformation into a water-soluble form). Such a conversion "unrolls" the tight molecular ball of lignite and creates water-soluble humic acids, either as a liquid or in the form of sodium, potassium, or ammonium salts (known as humates). Such a water-soluble form is desirable, as in their soluble form, humic acids can readily chelate nutrients, preserve nitrates from leaching, enhance root development, and improve overall crop vigor and yields.

It is also known that there are numerous nutrients beneficial for soil growth that may not be present in large enough quantities or in a usable form in the soil. For example, a zinc deficiency may present in the form of stunted plants with small, yellowed, and/or deformed leaves. Zinc may often be present in soil organic matter in a chelated form. Chelation is the process of holding or binding of a metal (e.g. zinc) to a large organic molecule. Due to being chelated to soil particles these nutrients (e.g. zinc) are not able to readily move through the soil, and as such they may not available to plants.

With respect to sulfur in the soil, about 70% to about 90% of sulfur present in soil is conventionally in the form of organic matter. This sulfur, contained with the organic matter, must be converted to sulfate by soil bacteria in order to be usable by plants. Conventionally, this conversion is very inefficient, making only small amounts of sulfate available to plants.

There exists a need in the art for a fusion compound combining the functional carbons of potassium humate with zinc sulfate in order to meet the complex needs of plants.

SUMMARY OF EMBODIMENTS

The present embodiments provide one or more of the features recited in the appended claims and/or the following features which alone or in combination, may comprise patentable subject matter.

In a first aspect, a process for making a potassium humate zinc sulfate compound includes: obtaining a plurality of fully-soluble potassium humate powder particles; obtaining a zinc sulfate compound; and mixing the plurality of potassium humate particles with the zinc sulfate compound, thus forming a homogenized mixture; and thereby forming a potassium humate zinc sulfate compound configured to be applied to a soil surface.

In some embodiments, the potassium humate zinc sulfate compound is a powder. In other embodiments, the potassium humate zinc sulfate compound is a granule and the process further includes: adding a binder to the homogenized mixture; and granulating the homogenized mixture into a granule, thus making a potassium humate zinc sulfate compound granule. In some such instances, the binder is water. In some such instances, this granulating occurs at a temperature ranging between about 65 degrees Fahrenheit and about 190 degrees Fahrenheit.

In some embodiments, obtaining the plurality of fully-soluble potassium humate powder particles further includes: obtaining a sample of a carbonaceous substance comprising humic acid and one or more other substances; contacting the sample with an amount of an alkaline mixture, thereby forming an extraction mixture, the extraction mixture consisting essentially of a sludge component; the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; and spray drying the extraction component, thereby forming the plurality of potassium humate powder particles.

In some embodiments, the zinc sulfate compound is a powder zinc sulfate.

In some embodiments, the homogenized mixture includes about 5 pounds to about 500 pounds of the plurality of potassium humate powder particles to about 1,995 pounds to about 1,500 pounds of zinc sulfate. In other embodiments, the potassium humate zinc sulfate compound has a pH of 2 to about 12. In still other embodiments, at least 95% of the plurality of potassium humate powder particles dissolve within five minutes when submerged in one liter of water at a temperature of 25 degrees Celsius.

In another aspect, a process for making a potassium humate zinc sulfate compound includes: obtaining a plurality of potassium humate powder particles, where at least 95% of the plurality of potassium humate powder particles dissolve within five minutes when submerged in one liter of water at a temperature of 25 degrees Celsius; obtaining a zinc sulfate compound; and mixing the plurality of potassium humate particles with the zinc sulfate, thereby forming a homogenized mixture; where the homogenized mixture includes about 5 pounds to about 500 pounds of the plurality of potassium humate powder particles to about 1,995 pounds to about 1,500 pounds of zinc sulfate compound; thereby forming a potassium humate zinc sulfate compound configured to be applied to a soil surface.

In some embodiments, the potassium humate zinc sulfate compound is a powder. In other embodiments, the potassium humate zinc sulfate compound is a granule and the process further includes: adding a binder to the homogenized mixture; granulating the homogenized mixture into a granule, thereby making a potassium humate zinc sulfate compound granule. In some such embodiments, the binder is water. In other such instances, the granulating occurs at a temperature ranging between about 65 degrees Fahrenheit and about 190 degrees Fahrenheit. In some instances, the potassium humate zinc sulfate compound has a pH of 2 to about 12.

In still yet another aspect, a potassium humate zinc sulfate compound includes: a powder potassium humate component, where at least 95% of the plurality of potassium humate powder particles dissolve within five minutes when submerged in one liter of water at a temperature of 25 degrees Celsius; a zinc sulfate component; where the powder potassium humate component and the zinc sulfate component are homogenized at a ratio ranging between about 1:399 to and about 1:3; where the potassium humate zinc sulfate compound has a pH of 2 to about 12.

In some embodiments, the potassium humate zinc sulfate compound is a powder configured to be applied to a soil surface. In other instances, the potassium humate zinc sulfate compound is a granule.

BRIEF DESCRIPTION OF THE FIGURES

FIG. 2A illustrates potassium humate zinc sulfate granules about 0.8 mm to about 1.99 mm in diameter; FIG. 2B illustrates potassium humate zinc sulfate granules about 2.0 to about 4.0 mm in diameter. Each of FIGS. 2A-2B include a United States penny for reference, which has a standard diameter of 19.05 mm.

DETAILED DESCRIPTION

A process and composition such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

When used in this specification and the claims, "humate" refers to a fully-water soluble humic acid composition in the form of a salt. For example "potassium humate" is a fully-water soluble potassium salt of humic acid, "ammonium humate" is a fully-water soluble ammonium salt of humic acid, and so on.

Aspects of a process such as is described in various embodiments herein are further illustrated by the following examples, which are set forth to illustrate certain aspects of a process such as is described in various embodiments herein and are not to be construed as limiting thereof.

Figure 1:
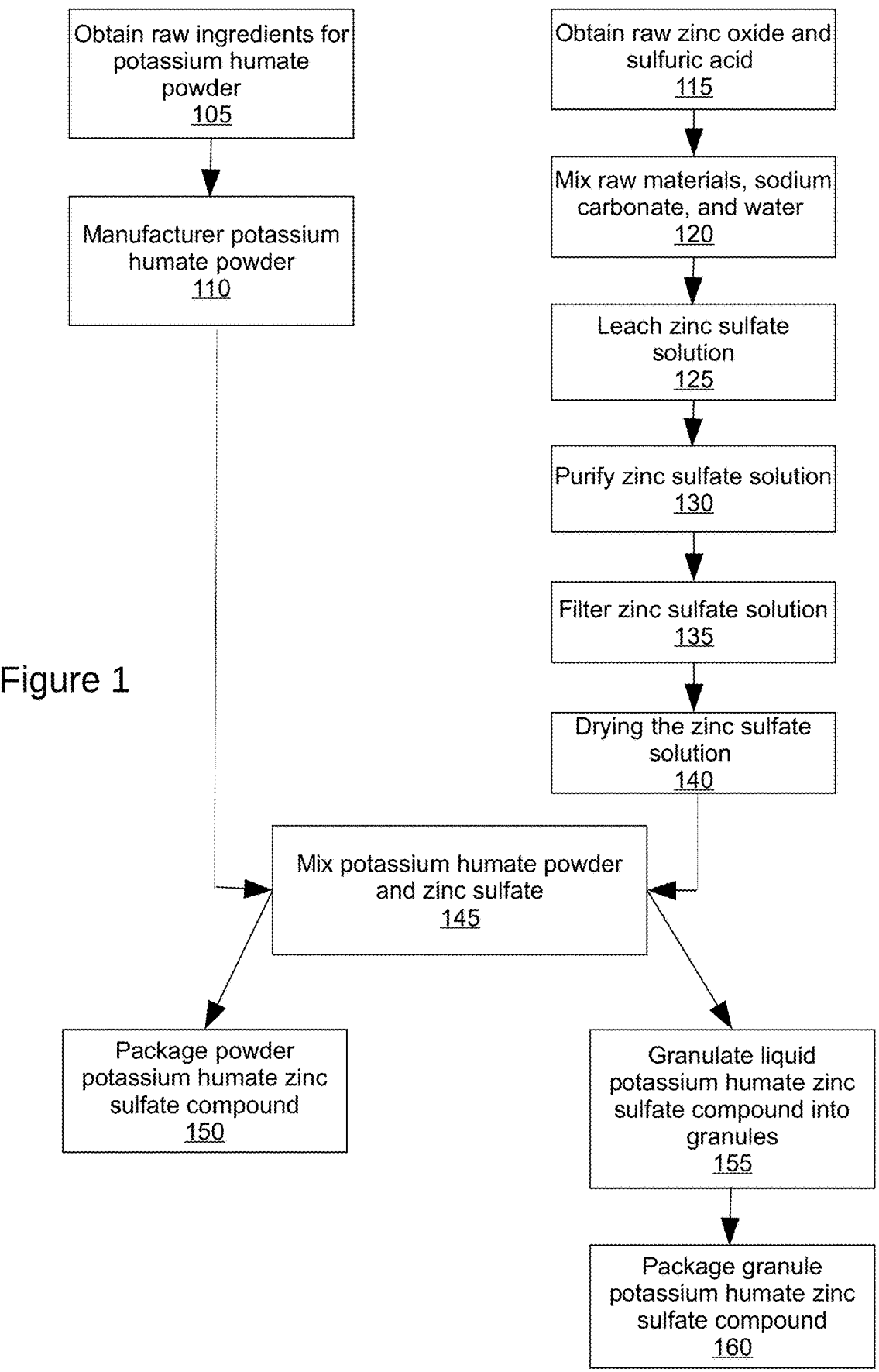
FIG. 1 is a flowchart illustrating an example sequence of operations for manufacturing a potassium humate zinc sulfate compound consistent with some embodiments described herein.

Referring now to FIG. 1, in an example, a method of making a potassium humate zinc sulfate compound 100 is illustrated a multi-step process. This process includes, at block 105, obtaining the raw materials for making the potassium humate powder, and then, at block 110, manufacturing the potassium humate powder. The manufacturing, at block 110, includes blending of raw material and an alkaline mixture in a blend tank; screening of the blended mixture that was made in the blend tank; and drying of the liquid derived from screening of the blended mixture, thereby forming a fine potassium humate powder. At blocks 115-140, the zinc sulfate compound is made, which will be discussed in detailed herein. At block 145, the fine potassium humate powder is added to the zinc sulfate compound, forming a homogenized mixture, the homogenized mixture thereby forming the potassium humate zinc sulfate compound. This compound may then be packaged into one of two forms: (1) packaged for use in a powder form (block 150); or (2) formed into granules (block 155) and packaged for use in granule form (block 160).

More specifically the manufacturing of the potassium humate powder includes, in an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the insoluble sand, clay, and humin fraction, also known as sludge. The amount of sludge varied, but typically the sludge was about 5-7% of the total weight of the blended mixture.

In an example, the screened humic acid enriched liquid, which had a density of 8.35-9 lb/gallon, was collected in an insulation tank, which had a capacity of 12500 gal. The humic acid enriched liquid was pumped from the insulation tank to a spray dryer firing tank from which it was transferred to a spray dryer.

In an example, a spray dryer system comprised a burner, a dryer, two cyclone separators, a baghouse and a powder hopper. Humic acid enriched liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The humic acid enriched liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a humic acid enriched powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The potassium humate or humic acid enriched powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the potassium humate powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns. This fine, fully soluble potassium humate powder may be combined with zinc sulfate to form the potassium humate zinc sulfate compound.

The zinc sulfate utilized herein may be, in some instances, formed by obtaining the necessary raw materials (block 115), including zinc oxide and sulfuric acid. At block 120, these raw materials may be mixed in a reactor tank also containing sodium carbonate and water in order to purify the raw materials. At block 125, the mixture goes through a leaching process. During the leaching process, the mixture is filtered and a brine results. This brine may then go through a water treatment process. A "cake", a solidified or semi-solidified sediment, may results from the water treatment process, this "cake" may then be added to a counter current washing process. Following the counter-washing the zinc-rich materials obtained may then be reacted with sulfuric acid. The result of this chemical reaction is passed through a filter press, which retains all non-leachable solids, resulting in a zinc sulfate solution free of particles. At block 130, zinc sulfate solution, now free of particles, goes through a further purification process, in which zinc dust is added to perform an ion exchange between the zinc, lead and cadmium contents in the solution. At block 135, the heavy metal-free solution is then filtered through a filter press to retain all the solid precipitates. Finally, at block 140, the resulting zinc sulfate solution may be dried, either by the spray drying into powders an/or granulated using a fluid bed dryer. During the drying process, regardless of whether a powder or granule is formed, the purified solution is in contact with combustion gases generated from natural gas burning, and as a result water is evaporated. The resulting product is a salt of zinc sulfate monohydrate.

The process for manufacturing the zinc sulfate (blocks 115-140) may occur at elevated temperatures, for example about 800 degrees Fahrenheit. Such elevated temperatures may denature the active components of the potassium humate, and accordingly the zinc sulfate and potassium humate powder may require mixing at a lower temperature (block 145). For example, this mixing and subsequent granulation (if occurring) may be about 65 degrees Fahrenheit to about 190 degrees Fahrenheit. In an example, the potassium humate zinc sulfate compound may be manufactured using a batch or a continuous flow method depending on the manufacturing set up and/or product demand needs. In some instances, they are continuously mixed, for example by stirring or blending, until the zinc sulfate and potassium humate form one substantially homogenous mixture. In some instances, the potassium humate zinc sulfate compound powder may then be packaged (block 150) and applied to a soil.

In still other embodiments, the potassium humate zinc sulfate compound may be granulated (block 155), as will be discussed in detail herein, and used in the form of granules. In a non-limiting example, this granulation may be done via a rotary pelletizing cone. In such instances, water may be added as a binding agent. Other binders may include, but are not limited to, lingo sulfanate, mineral oil, vegetable oil, or the like. The powder rotates in the pelletizer and agglomerates into substantially round granules. The resulting granules may then be packaged (block 160) and applied to a soil.

The resulting potassium humate zinc sulfate compound powder or granule compound has been found to aid plant growth in both agricultural and horticultural applications. Traditionally, soil organic matter may hold zinc in a chelated form; chelation is the process of holding or binding of a metal (e.g. zinc) to a large organic molecule. Due to the zinc being chelated to soil particles, it does not readily move through the soil, and thus is not available to plants. Additionally, about 70% to about 90% of sulfur present in soil is also conventionally in the form of organic matter, which must be converted to sulfate by soil bacteria in order to be usable by plants. Typically, various soil bacteria convert the zinc sulfate into the usable forms of zinc and sulfate; however, this process may be slow as the zinc sulfate may take a while to break down. The potassium humate zinc sulfate compound, may for example, in calcareous soils, may cause fixed calcium carbonates and free lime to release calcium in soil solution, while the potassium humate (soluble humic acid) may alter the rhizodeposition and plant roots. This may result in a metamorphosis of overall root architecture, provide more root hair, and translocate the exchangeable calcium to the plant roots and plant tissues. The potassium humate also may simultaneously buffer, chelate, and complex macro-micronutrients, making them more readily available to roots and plants. Furthermore, due to its nanoparticle size the potassium humate (soluble humic acid) may create micropores for roots, water, and nutrients to reside, which may become oxygenated as a result of the dynamics of soil physics. The combination of the potassium humate (soluble humic acid) and zinc sulfate may enhance the effect of conversion of zinc sulfate to a usable form of zinc.

Aspects of a process such as is described in various embodiments herein are further illustrated by the following further examples, which are set forth to illustrate certain aspects of a process such as is described in various embodiments herein and are not to be construed as limiting thereof.

Further example 1. A process for making a potassium humate zinc sulfate compound, the process comprising:
obtaining a plurality of fully-soluble potassium humate powder particles;
obtaining a zinc sulfate compound; and
mixing the plurality of potassium humate particles with the zinc sulfate, thereby forming a homogenized mixture;
thereby forming a potassium humate zinc sulfate compound configured to be applied to a soil surface.

Further example 2. A process according to further example 1, wherein the potassium humate zinc sulfate compound is a powder.

Further example 3. A process according to further example 1, wherein the potassium humate zinc sulfate compound is a granule, and the process further includes: adding a binder to the homogenized mixture; granulating the homogenized mixture into a granule, thereby making a potassium humate zinc sulfate compound granule.

Further example 4. A process according to further example 3, wherein the binder is water.

Further example 5. A process according to further example 3, wherein about 1 to about 25 gallons of binder are added per ton of homogenized powder.

Further example 6. A process according to further example 1, wherein obtaining the plurality of fully-soluble potassium humate powder particles further includes:
obtaining a sample of a carbonaceous substance comprising humic acid and one or more other substances;
contacting the sample with an amount of an alkaline mixture, thereby forming an extraction mixture, the extraction mixture consisting essentially of a sludge component;
the sludge component comprising, predominantly, the sample, and an extraction component, the extraction component comprising, predominantly, the alkaline mixture;
maintaining the sludge component in contact with the extraction component for a period of time sufficient for the extraction component to become relatively enriched in humic acid and the sludge component to become relatively depleted of humic acid;
separating the sludge component from the extraction component; and
spray drying the extraction component, thereby forming the plurality of potassium humate powder particles.

Further example 7. A process according to further example 6, wherein the carbonaceous substance comprises a coal and/or a claystone and/or a mudstone and/or a shale.

Further example 8. A process according to further example 6, wherein the carbonaceous substance comprises a lignite and/or a Leonardite and/or a Humalite.

Further example 9. A process according to further example 6, wherein the carbonaceous substance comprises a Humalite.

Further example 10. A process according to further example 6, wherein the alkaline mixture comprises water.

Further example 11. A process according to further example 6, wherein the alkaline mixture comprises a base.

Further example 12. A process according to further example 6, wherein the alkaline mixture comprises sodium hydroxide or potassium hydroxide.

Further example 13. A process according to further example 6, wherein the alkaline mixture comprises caustic potash solution.

Further example 14. A process according to further example 6, wherein the alkaline mixture comprises, by mass, between about 10 and about 15 parts water, and about 1 part caustic potash solution, wherein the caustic potash solution is 45% membrane grade.

Further example 15. A process according to further example 6, wherein the alkaline mixture comprises, by mass, about 73.7 parts water and about 5.8 parts caustic potash solution, wherein the caustic potash solution is 45% membrane grade.

Further example 16. A process according to further example 6, wherein the mass ratio of the alkaline mixture to the sample is between about 75:25 and about 84:16.

Further example 17. A process according to further example 6, wherein the mass ratio of the alkaline mixture to the sample is between about 78:22 and about 81:13.

Further example 18. A process according to further example 6, wherein the mass ratio of the alkaline mixture to the sample is about 79.5:20.5.

Further example 19. A process according to further example 6, wherein the sludge component is maintained in contact with the extraction component for between about 4 hours and about 12 hours.

Further example 20. A process according to further example 6, wherein the sludge component is maintained in contact with the extraction component for between about 6 hours and about 10 hours.

Further example 21. A process according to further example 6, wherein the sludge component is maintained in contact with the extraction component for about 8 hours.

Further example 22. A process according to further example 6, wherein the sludge component is maintained in contact with the extraction component for a period of time sufficient for the extraction component to possess a humic acid content of at least about 6%.

Further example 23. A process according to further example 6, wherein the sludge component is maintained in contact with the extraction component for a period of time sufficient for the extraction component to possess a humic acid content of at least about 14%.

Further example 24. A process according to further example 6, wherein the sludge component is maintained in contact with the extraction component for a period of time sufficient for the extraction component to possess a humic acid content of at least about 17%.

Further example 25. A process according to further example 6, wherein the sludge component is maintained in contact with the extraction component for a period of time sufficient for the extraction component to possess a humic acid content of at least about 18%.

Further example 26. A process according to further example 6, wherein the separating is effected by filtration.

Further example 27. A process according to further example 6, wherein the separating is effected by sedimentation.

Further example 28. A process according to further example 6, wherein the drying is effected by spray drying.

Further example 29. A process according to further example 6, wherein the drying is effected by spray drying, and wherein the spray drying is characterized by an inlet temperature and an outlet temperature, and wherein the inlet temperature passing through a burner heats to between about 400 degrees Fahrenheit and about 800 degrees Fahrenheit, and wherein the outlet temperature is between bout 150 degrees Fahrenheit and about 250 degrees Fahrenheit.

Further example 30. A process according to further example 6, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further example 31. A process according to further example 6, wherein the plurality of powder particles is characterized by a moisture content, and wherein the moisture content is between about 9% and about 15%.

Further example 32. A process according to further example 6, wherein the plurality of powder particles is characterized by a moisture content, and wherein the moisture content is between about 10% and about 14%.

Further example 33. A process according to further example 6, wherein the plurality of powder particles is characterized by a moisture content, and wherein the moisture content is between about 11% and about 13%.

Further example 34. A process according to further example 6, wherein the plurality of powder particles is characterized by a loose bulk density, and wherein the loose bulk density is between about 28 and about 49 pounds per cubic foot.

Further example 35. A process according to further example 6, wherein the plurality of powder particles is characterized by a loose bulk density, and wherein the loose bulk density is between about 31.5 and about 45.5 pounds per cubic foot.

Further example 36. A process according to further example 6, wherein the plurality of powder particles is characterized by a loose bulk density, and wherein the loose bulk density is between about 35 and about 42 pounds per cubic foot.

Further example 37. A process according to further example 6, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further example 38. A process according to further example 1, wherein at least about 75% of the plurality of potassium humate particles are dissolved in five minutes when submerged in one liter of water at a temperature of 25 degrees Celsius.

Further example 39. A process according to further example 1, wherein at least about 90% of the plurality of potassium humate particles are dissolved in five minutes when submerged in one liter of water at a temperature of 25 degrees Celsius.

Further example 40. A process according to further example 1, wherein at least about 95% of the plurality of potassium humate particles are dissolved in five minutes when submerged in one liter of water at a temperature of 25 degrees Celsius.

Further example 41. A process according to further example 1, wherein at least about 99% of the plurality of potassium humate particles are dissolved in five minutes when submerged in one liter of water at a temperature of 25 degrees Celsius.

Further example 42. A process according to further example 1, wherein 100% of the plurality of potassium humate particles are dissolved in five minutes when submerged in one liter of water at a temperature of 25 degrees Celsius.

Further example 43. A process according to further example 1, wherein at least about 75% of the plurality of potassium humate particles are dissolved in one minute when submerged in one liter of water at a temperature of 25 degrees Celsius.

Further example 44. A process according to further example 1, wherein at least about 90% of the plurality of potassium humate particles are dissolved in one minute when submerged in one liter of water at a temperature of 25 degrees Celsius.

Further example 45. A process according to further example 1, wherein at least about 95% of the plurality of potassium humate particles are dissolved in one minute when submerged in one liter of water at a temperature of 25 degrees Celsius.

Further example 46. A process according to further example 1, wherein at least about 99% of the plurality of potassium humate particles are dissolved in one minute when submerged in one liter of water at a temperature of 25 degrees Celsius.

Further example 47. A process according to further example 1, wherein 100% of the plurality of potassium humate particles are dissolved in one minute when submerged in one liter of water at a temperature of 25 degrees Celsius.

Further example 48. A process according to further example 1, wherein obtaining zinc sulfate includes obtaining a commercially available zinc sulfate composition.

Further example 49. A process according to further example 1, wherein obtaining zinc sulfate further includes:
  obtaining raw materials, including zinc oxide and sulfuric acid;
  mixing the zinc oxide and the sulfuric acid with water and sodium carbonate, thereby forming a zinc sulfate solution;
  leaching the zinc sulfate solution, thereby forming a leached zinc sulfate solution;
  purifying the leached zinc sulfate solution, thereby forming a purified zinc sulfate solution; and
  filtering the purified zinc sulfate solution through a filter press, retaining all solid precipitates and thereby forming a final zinc sulfate solution.

Further example 50. A process according to further example 49, wherein mixing the zinc oxide and the sulfuric acid with water and sodium carbonate occurs at about 60 degrees Celsius to about 65 degrees Celsius.

Further example 51. A process according to further example 49, wherein the zinc oxide, sulfuric acid, water, and sodium carbonate are mixed for approximately 8 hours.

Further example 52. A process according to further example 49, wherein leaching the zinc sulfate solution additionally includes filtering the zinc sulfate solution, resulting in a brine; subjecting the brine through a water treatment process, resulting in a "cake", or solidified or semi-solidified sediment. This "cake", or solidified or semi-solidified sediment, is subjected0 to a counter current washing process, after which the zinc-rich materials are reacted with sulfuric acid, the result of this is passed through a filter press, which retains all non-leachable solids, resulting in a zinc sulfate solution free of particles.

Further example 53. A process according to further example 49, wherein leaching the zinc sulfate solution occurs at a temperature of about 80 degrees Celsius to about 90 degrees Celsius.

Further example 54. A process according to further example 49, wherein purifying the leached zinc sulfate solution includes adding zinc dust to the leached zin sulfate to perform an ion exchange between the zinc, lead and cadmium contents in the solution.

Further example 55. A process according to further example 49, wherein purifying the leached zinc sulfate solution occurs at a temperature of about 70 degrees Celsius to about 80 degrees Celsius.

Further example 56. A process according to further example 49, further includes drying the final zinc sulfate solution for about 15 minutes at about 550 degrees Celsius in order to form zinc sulfate powder.

Further example 57. A process according to further example 1, wherein the potassium humate zinc sulfate compound is a granule, and the process further includes solidifying by an apparatus comprising at least a rotary pelletizing cone and flat surface (e.g. conveyor belt).

Further example 58. A process according to further example 57, wherein the granulating occurs at a temperature ranging between about 65 degrees Fahrenheit and about 190 degrees Fahrenheit. This low temperate is important to preserve the benefits of the potassium humate powder. Granulating at too high of a temperature for a lengthy period of time may result in denaturing the active components of the potassium humate.

Further example 59. A process according to further example 57, wherein the flat surface is a steel belt.

Further example 60. A process according to further example 59, wherein the solidifying further includes cooling the mixture on the flat surface.

Further example 61. A process according to further example 60, wherein the cooling is effectuated by spraying a cooled liquid solution (e.g., 40 to 50 degrees Fahrenheit), for example water, on the underside of the steel belt, resulting in the cooling of the belt and subsequently the homogenized mixture deposited thereon.

Further example 62. A process according to further example 60, wherein the cooling is effectuated by moving the belt into, or through, a chiller. In some instances, such a chiller may be set to about 40 to 50 degrees Fahrenheit, although this is not to be understood as limiting.

Further example 63. A process according to further example 60, wherein the cooling may be any other active means of cooling known in the art, such as other forms of refrigeration or freezing.

Further example 64. A process according to further example 60, wherein the cooling may be a passive means of cooling; for example the cooling may be simply allowing the mixture to cool to room temperature without any further intervention.

Further example 65. A process according to further example 57, wherein the process further includes passing the resulting granules through a sized screen to produce a desired granule size.

Further example 66. A process according to further example 57, wherein the potassium humate zinc sulfate compound granule is between about 0.5 mm and about 5.0 mm.

Further example 67. A process according to further example 57, wherein the potassium humate zinc sulfate compound granule is between about 0.8 mm and about 4.0 mm.

Further example 68. A process according to further example 57, wherein the potassium humate zinc sulfate compound granule is between about 0.8 mm and about 1.99 mm.

Further example 69. A process according to further example 1, wherein the potassium humate zinc sulfate compound granule is between about 2.0 mm and about 4.0 mm.

Further example 70. A process according to further example 1, wherein the potassium humate zinc sulfate compound granule has a pH of at least 2.

Further example 71. A process according to further example 1, wherein the potassium humate zinc sulfate compound granule has a pH of 2 to about 12.

Further example 72. A process according to further example 1, wherein the potassium humate zinc sulfate compound granule has a pH of about 7.

Further example 73. A process according to further example 1, wherein the process further includes applying the potassium humate zinc sulfate compound to a desired site, such as an agriculture setting.

Aspects of a potassium humate zinc sulfate compound such as is described in various embodiments herein are further illustrated by the following further examples, which are set forth to illustrate certain aspects of the potassium humate zinc sulfate compound described in various embodiments herein and are not to be construed as limiting thereof.

Further example 74. A potassium humate zinc sulfate compound, the compound made by a process comprising:
  obtaining a plurality of fully-soluble potassium humate powder particles;
  obtaining a zinc sulfate compound; and
  mixing the plurality of potassium humate particles with the zinc sulfate, thereby forming a homogenized mixture;
  thereby forming a potassium humate zinc sulfate compound configured to be applied to a soil surface.

Further example 75. A potassium humate zinc sulfate compound comprising:
  a powder potassium humate component, wherein at least 95% of the plurality of potassium humate powder particles dissolve within five minutes when submerged in one liter of water at a temperature of 25 degrees Celsius;
  a zinc sulfate component;
  wherein the powder potassium humate component and the zinc sulfate are homogenized at a ratio ranging between about 1:399 to and about 1:3;
  wherein the potassium humate zinc sulfate compound has a pH of 2 to about 12.

Further example 76. A potassium humate zinc sulfate compound according to further example 75, wherein the potassium humate zinc sulfate compound is a powder.

Further example 77. A potassium humate zinc sulfate compound according to further example 75, wherein potassium humate zinc sulfate compound is a granule.

Further example 78. A potassium humate zinc sulfate compound according to further example 77, wherein the potassium humate zinc sulfate compound granule is between about 0.5 mm and about 5.0 mm.

Further example 79. A potassium humate zinc sulfate compound according to further example 77, wherein the potassium humate zinc sulfate compound granule is between about 0.8 mm and about 4.0 mm.

Further example 80. A potassium humate zinc sulfate compound according to further example 77, wherein the potassium humate zinc sulfate compound granule is between about 0.8 mm and about 1.99 mm.

Further example 81. A potassium humate zinc sulfate compound according to further example 77, wherein the potassium humate zinc sulfate compound granule is between about 2.0 mm and about 4.0 mm.

Further example 82. A potassium humate zinc sulfate compound according to further example 75, wherein the potassium humate zinc sulfate compound is configured to be applied to a desired location.

Further example 83. A potassium humate zinc sulfate compound according to further example 82, wherein the desired location is an agricultural soil.

Further example 84. A potassium humate zinc sulfate compound according to further example 82, wherein the potassium humate zinc sulfate compound granules between about 2.0 mm and about 4.0 mm may be applied to agricultural soils.

Further example 85. A potassium humate zinc sulfate compound according to further example 82, wherein the potassium humate zinc sulfate compound granules between about 0.8 mm and about 1.99 mm may be applied to turf soils.

Figure 2A:
FIGS. 2A-B are photographic illustrations of potassium humate zinc sulfate granules consistent with some embodiments described herein.
Figure 2B:

Further example 86. A plurality of potassium humate zinc sulfate granules according to further example 77, are illustrated in FIGS. 2A-B. As evident by FIGS. 2A-B the granules may generally vary in shape and size, and in some instances varying sizes and shapes may be utilized for different purposes. For example, in some instances smaller composite granules (e.g. about 0.8 to about 1.99 mm in diameter), such as those illustrated in FIG. 2A, may be utilized in turf applications (e.g. on golf courses, lawn maintenance, etc.). In other instances, larger granules (e.g. about 2.0 to about 4.0 mm in diameter), such as those illustrated in FIG. 2B, may be utilized in agricultural applications. However, it is to be understood that these examples are for illustrative purposes only and are non-limiting.

Further example 87. A plurality of potassium humate zinc sulfate granules according to further example 86 were subjected to crush strength testing. The composite granules were separated by size, with potassium humate zinc sulfate granules ranging from about 0.8 to 1.99 mm in diameter being tested together and potassium humate zinc sulfate granules ranging from about 2.0 to about 4 mm in diameter being tested together. Crush strength testing was conducted for granules ranging from about 0.8 to 1.99 mm in diameter and for granules ranging from about 2.0 to about 4.0 mm in diameter, respectively. SGN, or Size Guide Number is a standard measurement of the diameter, as expressed in millimeters×100, of granules based on the median within the batch. As illustrated in Table 1, the crush strength measurements of the granules ranging from about 0.8 to 1.99 mm in diameter range from about 6.5 psi to about 8.0 psi. The crush strength measurements of the granules ranging from about 2.0 to 4.0 mm in diameter range from about 3.5 psi to about 5.0 psi. However, it is to be understood that these examples are for illustrative purposes only and are non-limiting, in some instances the crush strength of a granule consistent with the description herein may range anywhere from 0.1 psi to 10 psi.

TABLE 1

| SGN | Crush Test Results |
|---|---|
| 140-200 | 6.5-8.0 |
| 200-400 | 3.5-5.0 |

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A homogenous powder comprising humic substances, wherein the humic substances comprise particles of water-soluble potassium salts of humic acid and fulvic acid, and
   wherein at least 95% of the particles dissolve within 5 minutes when submerged in one liter of water at a temperature of 25 degrees Celsius.

2. The homogenous powder of claim 1, wherein the particles exhibit a moisture content of about 9 to about 15%.

3. The homogenous powder of claim 1, wherein the particles exhibit a loose bulk density of about 29 to about 49 pounds per cubic foot.

4. The homogenous powder of claim 1, wherein the homogenous powder is derived from leonardite.

5. The homogenous powder of claim 1, wherein about 55% of the particles by weight are less than 400 microns.

6. The homogenous powder of claim 1, wherein at least 99% of the particles dissolve within 5 minutes when submerged in one liter of water at a temperature of 25 degrees Celsius.

7. The homogenous powder of claim 1 further comprising a zinc sulfate compound.

8. A homogenous powder comprising humic substances, wherein the humic substances comprise at least water-soluble potassium humate particles, and wherein at least 95% of the water-soluble potassium humate particles dissolve within 5 minutes when submerged in one liter of water at a temperature of 25 degrees Celsius.

9. The homogenous powder of claim 8, wherein the water-soluble potassium humate particles exhibit a moisture content of about 9 to about 15%.

10. The homogenous powder of claim 8, wherein the water-soluble potassium humate particles exhibit a loose bulk density of about 29 to about 49 pounds per cubic foot.

11. The homogenous powder of claim 8, wherein the homogenous powder is derived from leonardite.

12. The homogenous powder of claim 8, wherein about 55% of the water-soluble potassium humate particles by weight are less than 400 microns.

13. The homogenous powder of claim 8, wherein at least 99% of the water-soluble potassium humate particles dissolve within 5 minutes when submerged in one liter of water at a temperature of 25 degrees Celsius.

14. The homogenous powder of claim 8 wherein the humic substances further comprise fulvic acid.

* * * * *